United States Patent [19]

Sambrook et al.

[11] Patent Number: 4,530,918
[45] Date of Patent: Jul. 23, 1985

[54] CATALYSTS AND METHOD OF THEIR PREPARATION

[75] Inventors: Rodney M. Sambrook, Sheffield; Julian R. H. Ross, Cleckheaton, both of England

[73] Assignee: Dyson Refractories Limited, England

[21] Appl. No.: 545,521

[22] Filed: Oct. 26, 1983

Related U.S. Application Data

[63] Continuation of Ser. No. 283,793, Jul. 16, 1981, Pat. No. 4,469,815.

[30] Foreign Application Priority Data

Jul. 16, 1980 [GB] United Kingdom ............... 8023224
Jul. 16, 1980 [GB] United Kingdom ............... 8023226

[51] Int. Cl.³ .................. B01J 21/04; B01J 23/10; B01J 23/76
[52] U.S. Cl. .................. 502/303; 502/174; 423/654
[58] Field of Search .............. 502/174, 176, 303; 423/654

[56] References Cited

U.S. PATENT DOCUMENTS

Re. 28,655  12/1975  Rostrup-Nielsen ............. 502/328
3,394,086    7/1968  Taylor et al. .................. 502/328 X
3,444,099    5/1969  Taylor et al. .................. 502/306
3,515,527    6/1970  Cockerham et al. ........... 502/174
3,928,002   12/1975  Mirokawa et al. ............. 502/328
4,124,629   11/1978  Hansford ...................... 502/332 X
4,215,998    8/1980  Futami ......................... 502/303 X

FOREIGN PATENT DOCUMENTS 1055909  1/1967  United Kingdom .
1104843  2/1968  United Kingdom .

Primary Examiner—W. J. Shine
Attorney, Agent, or Firm—King, Liles & Schickli

[57] ABSTRACT

The invention relates to a nickel containing catalyst composition of high thermal stability and which has outstanding resistance to carbon deposition, and is particularly but not exclusively for use in the steam reforming of hydrocarbons. The object of the invention is to provide an improved catalyst, which object is met by a catalyst derived from a precursor of approximate chemical composition

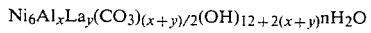
$$Ni_6Al_xLa_y(CO_3)_{(x+y)/2}(OH)_{12+2(x+y)}nH_2O$$

where x is not less than 1 and not greater than 4; y is not less than 0.05 and not greater than 1.5 and n is approximately 4.

23 Claims, No Drawings

CATALYSTS AND METHOD OF THEIR PREPARATION

This is a continuation of application Ser. No. 283,793, filed July 16, 1981, now U.S. Pat. No. 4,469,815.

This invention relates to a nickel containing catalyst composition of high thermal stability and which has outstanding resistance to carbon deposition, and is particularly but not exclusively for use in the steam reforming of hydrocarbons.

Nickel catalysts formed from coprecipitated materials and homogeneous on a microscopic scale are commonly used for the production of SNG by the low temperature steam reforming of liquid hydrocarbons. Similar materials may be used for the methanation of carbon oxides. These processes require catalysts of high activity at relatively low temperatures. Normally, the thermal stability and other physical parameters such as mechanical strength, and abrasion resistance of such catalysts are of secondary importance. The more successful catalysts are derived from a coprecipitated layer compound with the typical formulation.

$$Ni_6Al_2(OH)_{16}CO_3 4H_2O$$

This compound is formed from a solution of nickel and aluminium salts by the addition of alkali (for example, sodium carbonate), and is followed by calcination of the product in air and forming into a suitable shape by, for example, tabletting, to give the finished product. The catalyst is normally reduced in situ prior to use. Precipitation of the layer compound may also be brought about homogeneously using a hydrolysable organic material. Alkali metal oxides, in particular, potassium oxide may be included in the catalyst formulation to improve the carbon gasification activity of the reduced catalyst. More recent developments include a thermally stable material prepared in the same way but promoted by chromia, added in the form of chromium nitrate during the preparation.

According to the present invention, a catalyst is derived from a precursor of approximate chemical composition.

$$Ni_6Al_xLa_y(CO_3)_{(x+y/2)}(OH)_{12+2(x+y)} nH_2O$$

where x is not less than 1 and not greater than 4; y is not less than 0.05 and not greater than 1.5 and n is approximately 4. Preferably, x and y are in the range 1.5 to 3 and 0.1 to 0.5 respectively. It is possible for part of the nickel content to be replaced by magnesium. Therefore in accordance with a further aspect of the invention a catalyst is derived from a precursor of the approximate chemical composition.

$$Ni_{6-z}Al_xLa_yMg_z(CO_3)_{(x+y)/2}(OH)_{12+2(x+y)}.nH_2O$$

and where z is not less than 0.1 and not greater than 4. Again it is preferred that x and y are in the range 1.5 to 3 and 0.1 to 0.5 respectively. In a preparative route based on coprecipitation lanthanum ions are incorporated in a layer structure. It is however not essential that lanthanum ions are so incorporated in a layer structure to realise the advantages of the overall catalyst composition of the invention. In the precursor, anions other than carbonate for example nitrates, phosphates etc., may also be present. The material may be prepared by coprecipitation from, for example, a solution of the nitrates, under controlled conditions of pH and temperature, by the addition of alkalis such as sodium carbonate, sodium hydroxide, ammonium bicarbonate or ammonium hydroxide. Preferably ammonium bicarbonate is used, as it has been found that the presence of sodium, even in trace amounts, has a detrimental effect on the activity and stability of the catalysts. Coprecipitation may also be induced by a homogeneous precipitation technique using a readily hydrolysable material such as urea. After precipitation, the material is filtered, washed and dried at elevated temperatures. It has been found that the removal of impurities such as sodium ions may be facilitated if the material is dried at an elevated temperature prior to washing. The washed and dried material is preferably only partially calcined at a temperature of approximately 300° C. prior to forming into a suitable shape for process requirements.

To achieve the overall catalyst composition of the invention it is obvious that other preparative techniques can be used such as sequential precipitation of each component or post-impregnation of the nickel-aluminium or nickel-aluminium-magnesium materials as the precipitate or the calcinate with a soluble salt of lanthanum. In either case the resultant material is subsequently dried, calcined and formed into a suitable shape.

The catalyst composition herein disclosed therefore relates to the addition of a lanthanum species to enhance the thermal stability and carbon gasification activity of a nickel containing material. The catalyst composition may be utilized either in a form in which it is held within a porous ceramic matrix or as an apparently homogeneous material, the form being chosen to meet the requirements of the particular process. The lanthanum component may be derived from pure lanthanum salts or mixtures of rare earth salts particularly lanthanum and cerium mixtures in which lanthanum is the major component.

Nickel catalyst compositions containing a lanthanum species may be used for example in the high temperature steam reforming of hydrocarbons. Other possible applications include the methanation of gases containing high concentrations of carbon oxides particularly arising from coal gasification processes. Hitherto commercial catalysts for the high temperature steam reforming of hydrocarbons have been prepared either by impregnation of a preformed support or by co-forming the ingredients to give the required final shape. However, a process to improve the thermal stability and activity of catalysts under severe operating conditions has been described in copending application Ser. No. 283,792 of even date herewith, in which an active material of high surface area is deposited within the pores of a preformed ceramic matrix by homogeneous precipitation techniques. The method allows the facile inclusion of various promoters and/or spacers. In this case the lanthanum species is preferably present in the precipitation solutions. However the lanthanum species may be added by post impregnation of the calcined nickel-aluminium material or nickel-aluminium-magnesium material contained within the pores of the ceramic matrix and subsequently calcining the resultant material. Simple impregnation of the preformed ceramic matrix with the soluble salts of nickel, lanthanum and for example aluminium and subsequent calcination to the oxides may also be used as a preparative technique. The metal loading of the catalyst may be increased by multi-impregnation/drying/calcination steps.

In the aforementioned preparative routes involving a ceramic matrix the final catalyst composition has the preferable range of nickel contents of 5–30 wt. % and 0.1–15 wt. % as lanthanum. If aluminium is present in the material added to the ceramic matrix it is preferred that the atomic ratios of Ni:Al in the active material are 1.5 to 4:1. If magnesium is present in the nickel-aluminium phase, it is preferred that the atomic ratios of Ni:Mg in the active material at 1 to 20:1.

Preferably the preformed ceramic matrix has an apparent porosity in the range of 15% to 80% and has a mean pore diameter in the range 0.1 $\mu$m to 20 $\mu$m. In the special case of hollow shapes such as hollow spheres the porosity and mean pore diameter of the wall will be in the aforementioned range. The preformed ceramic matrix may be $\alpha$-alumina but other preformed matrixes of ceramic materials such as silicon carbide aluminosilicates, silica etc., may be used.

The ceramic matrix may be pretreated with acid or alkali to modify the interaction of the catalytically active material and the ceramic matrix. The surface of the ceramic matrix may also be modified by the addition of "spacer/support" material, for example, alumina within the pores of the ceramic matrix prior to the addition of the active phase. This may be accomplished by the simple impregnation of the ceramic matrix with a soluble salts of the "spacer/support" material e.g. aluminium nitrate or by using the homogeneous precipitation technique. In each case the temperature of the calcination of the impregnated ceramic matrix must be carefully controlled to achieve the required surface properties.

In the preferred preparation of the lanthanum containing catalyst composition for high temperature applications, the preformed $\alpha$-alumina matrix is impregnated, under vacuum with a solution containing nickel, lanthanum and aluminium nitrates and also a precipitation agent such as urea. It should be noted that other promoters/spacers such as zirconium may be added, preferably as the nitrate, to further increase the stability and/or improve the selectivity of the catalyst. After draining, the $\alpha$-alumina matrix may be heated to a temperature suitable for the controlled hydrolysis of the urea thus increasing the H of the absorbed solution and bringing about the deposition of the insoluble hydroxides within the pores. The catalyst is then dried by heating to a suitably elevated temperature.

The metal loading of the catalyst may be increased by repetition of the process steps. Prior to re-impregnation of the catalyst the pores must be opened. In one aspect of the process the pores may be opened by thermal decomposition of material within the pores. Alternatively the catalyst is washed with water or weaker alkaline solution and then dried at a suitably elevated temperature. The catalyst of the required metal loading is subjected to a final calcination temperature of about 450° C.

Several non-limiting examples of the process of the invention and catalysts produced thereby are given below.

EXAMPLE 1

Coprecipitated Samples A and B were prepared using the following procedures.

A solution A was prepared by dissolving 291 g of $Ni(NO_3)_2 6H_2O$, 150 g of $Al(NO_3)_3.9H_2O$ and 32 g of $La(NO_3)_3 6H_2O$ in 1 dm$^3$ of de-ionised water; solution B was prepared by dissolving 300 g of anhydrous ammonium bicarbonate in 2.5 dm$^3$ of de-ionised water. Solution A was added dropwise and with vigorous stirring to solution B, both being maintained at room temperature. The pH remained at approximately 7 throughout the addition. When this was complete, the resultant slurry was heated slowly and with vigorous stirring to 80° C. to complete the precipitation by ensuring that any soluble nickel bicarbonate formed at 20° C. was decomposed. The precipitate was then filtered to dryness in a Buchner funnel, dried at 100° C. in a ventilated over for 48 h, washed in boiling de-ionised water (4 dm$^3$), and refiltered in the Buchner funnel where it was further washed with five idm$^3$ portions of boiling de-ionised water. It was then redried at 100° C. in the ventilated over for 24 h. The resultant material was ground to a fine powder and a sample of it was transferred to a silica boat in a tubular furnace in which it was heated in a flow of pure argon over a period of 175 min from room temperature to 450° C., at which temperature it was maintained for 17 h. This process brought about the complete decomposition of the precipitate to a mixture of the oxides. (Calcination in air rather than treatment in argon is also possible). The furnace was then cooled to 200° C. and hydrogen was mixed with the argon so that the $H_2$:Ar ratio was 2.0. The temperature was raised from 200° C. to 600° C. over a period of 170 min and the temperature was then maintained at 600° C. for 2 h. This brought about reduction of the nickel component of the catalyst. The temperature was lowered to room temperature and the sample was passivated by turning off the hydrogen flow and diverting the argon through a bottle containing water prior to contacting the catalyst, for a period of 3 h, with the argon+water mixture. The catalyst so produced had a Ni/Al atomic ratio of 2.5 and the lanthanum content, expressed as an atomic fraction (La)/(Nc+Al+La) was 0.05. The catalyst was designated Sample A.

An equivalent material (Sample B) was prepared following an identical procedure but omitting the lanthanum nitrate from Solution A, all other components being the same.

The Ni particle diameters of Samples A and B were determined by X-ray diffraction line-broadening techniques and were found to be 165 A and 156 A respectively. The samples were then aged in $H_2/H_2O$ flows ($H_2/H_2O = 8$) at 800° C. for a period of 3 h, a test which is generally accepted to give an indication of the stability of the supplies. It was found that in both cases, the resultant particle size was approximately 400 A.

Thus, we conclude that the presence of lanthanum has no detrimental effect on the resistance to sintering of the coprecipitated catalysts, each sintering to approximately the same extent.

The activities of samples A and B for the methanation of carbon monoxide were tested using a differential scanning calorimeter before and after the sintering test referred to above. It was found that the activity of sample A at 300° C. was 74% of the fresh activity after the sintering test whle that of sample B was 88% of the fresh activity after the test. We therefore conclude that lanthanum imparts a slight advantage to the catalyst in preserving its activity after exposure to $H_2/H_2O$ atmospheres. The catalysts so produced have good thermal stability and are capable of resisting carbon laydown.

EXAMPLE 2

A quantity of the washed precipitate from which was prepared Sample B was immersed in a solution of La(NO$_3$)$_3$.6H$_2$O the quantity and strength of the solution being such that the precipitate was just wetted and the quantity of lanthanum so introduced into the catalyst was such that the atomic fraction (La)/(Ni+Al+La) was 0.012. The sample was then decomposed and reduced as described in Example 1 (designated Sample C) and was tested for methanation activity in the DSC. The activity of Sample C at 300° C. was 54% higher than that of sample A.

EXAMPLE 3

100 g of a pure $\alpha$-Al$_2$O$_3$ which had been formed in the shape of Raschig rings (6 mm×6 mm) and having a total surface area of 0.7 m$^2$g$^{-1}$ and having a water absorption of 30% and a mean pore diameter of approximately 2.5 m were vacuum impregnated with a solution of 350 g of Ni(NO$_3$)$_2$6H$_2$O and 73 g of urea dissolved in 150 cm$^3$ of deionised water. Excess of the solution was drained from the $\alpha$-Al$_2$O$_3$ matrix. The impregnated rings were laid in a single layer on an aluminium tray and were placed in a ventilated oven at 95° C. for 17 h. Hydrolysis of the urea took place and a precipitate formed in the pores of the matrix. Decomposition of the precipitate and reduction of the resultant NiO was carried out as in Example 1 except that the decomposition was 4 h and reduction time (at 600° C.) was 4 h. The sample, designated Sample D, was passivated as before. A higher metal loading of the sample could be achieved by further impregnating the rings after thermal decomposition at 310° C. in an air oven for 2 h, a procedure which was essential to open the pores of the rings for further absorption of solutions.

Further samples were prepared using a solution of 350 g (Ni(NO$_3$)$_2$6H$_2$O, 150 g Al(NO$_3$)$_3$9H$_2$O and 217 g urea in 150 g of deionised water, and using a similar solution containing 50.5 g of La(NO$_3$)$_3$6H$_2$O in addition to the Ni and Al salts and the urea. Both samples were decomposed and reduced as for Sample D and were designated Samples E and F respectively. As for Sample D, the metals content could be increased by a series of steps involving partial decomposition and further impregnation. The following table gives the Ni contents (wt.%) of the reduced samples, the Ni particle diameters determined by X-ray diffraction and the total surface area (determined by adsorption of Krypton at −195° C.):

| Sample | Ni content/ wt. % | Average Ni particle diameter/Å | Total surface Area/m$^2$g$^{-1}$ |
|---|---|---|---|
| D | 4.5 | 257 | 2.5 |
| E | 4.3 | 198 | 7.6 |
| F | 4.2 | 117 | 6.5 |

It can be seen that the presence of Al gives an improved dispersion of the nickel and that La gives an even greater improvement. The increase in surface area compared with that of the $\alpha$-Al$_2$O$_3$ matrix (0.7 m$^2$g$^{-1}$) also reflects these improvements in dispersion.

EXAMPLE 4

The samples D, E, and F prepared in Example 3 were tested in a tubular flow reactor for their activities in the low pressure steam reforming of a heptane feed at an exit temperature of 650° C. The steam:carbon ratio was 4:1. Sample D was found to have good activity initially but this decreased with time and after 1 h, the sample had disintegrated presumably due to the deposition of carbon in the voids of the matrix. Sample E gave an improved activity but, although it did not disintegrate, back-pressure built up, again presumably due to carbon deposition. Sample F gave 100% conversion of the heptane feed over the period of the test and there was no evidence for carbon deposition. We therefore conclude that, in the $\alpha$-Al$_2$O$_3$ matrix, La has an advantageous effect on the catalyst, preventing carbon deposition reactions (i.e. giving greater carbon gasification rates).

EXAMPLE 5

Catalyst samples D, E and F were compared for their methanation activities in the differential scanning calorimeter. Their activities at 300° C. were in the ratio 6:3:2. It was noted that sample D became deactivated when methanation was carried out above 450° C. The samples were also subjected to a steam sinter test as described in Example 1, the duration of the test being 4 h. The subsequent activities of the samples were in the ratio 1:10:18. We therefore conclude that La improves the stability of the Ni-Al formulation when held in the $\alpha$-Al$_2$O$_3$ matrix much more than it does the coprecipitate (see Example 1).

EXAMPLE 6

The precursor to Sample F was washed using a series of different reagents prior to the decomposition stage. The reagents used were water, NaOH (0.1M), NA$_2$CO$_3$(0.1M), (NH$_4$)$_2$CO$_3$(0.1M) and KOH(0.1M). Samples of the undecomposed material were immersed in these reagents which has been preheated to 80°–90° C. and the temperature was raised to the boiling point of the reagent for 10 min. The reagent was then decanted and replaced by two portions of deionised water. In all cases, a volume of reagent three times that of the sample was used. The samples were then dried in a ventilated oven at 120° C. for 17 h. Thermal analysis investigations showed that water, KOH and NaOH were most effective at removing unreacted nitrates and unhydrolysed urea from the $\alpha$-Al$^2$O$^3$ matrix, leaving behind pure precipitates as described above. The washed samples were heated in argon to decompose the precipitate and reduced as described in Example 3. Their relative activities at 300° C. for the methanation of CO were determined with the differential scanning calorimeter as follows:

| Sample F | Ni content after washing/ wt % | Relative activity at 300° C. |
|---|---|---|
| NO treatment | 5.4 | 1.0 |
| H$_2$O | 3.9 | 2.6 |
| NaOH | 5.1 | 2.5 |
| Na$_2$CO$_3$ | 4.5 | 1.0 |
| (NH$_4$)$_2$CO$_3$ | 5.1 | 1.4 |
| KOH | not determined | 2.8 |

EXAMPLE 7

Two samples equivalent to samples E and F were made by a series of three depositions as described above. The La-free sample had a Ni content of 10.4 wt % and the La-containing sample had a Ni content of 9.5 wt. %. The Ni areas of the samples wer found, using hydrogen chemisorption at 20° C., to be 0.4 and 0.96 $m^2g^{-1}$ respectively. This further demonstrates the effect of La on the active material held within the $\alpha$-$Al^2O^3$ matrix, the Ni area being proportioned to the activity of the catalyst.

We claim:

1. A catalyst derived from a precursor having a layer structure and of the approximate chemical composition $$Ni_6Al_xLa_y(CO_3)_{(x+y)/2}(OH)_{12+2(x+y)}nH_2O$$

in which x is not less than 1 and not greater than 4; y is not less than 0.05 and not greater than 1.5 and n is approximately 4; said precursor being formed from a solution of Ni, Al, and La nitrates by adding alkali to coprecipitate the precursor from the solution and maintaining the pH and temperature of the solution substantially constant during the precipitation; said precursor then being calcined and reduced to form the catalyst.

2. A catalyst according to claim 1, wherein x is in the range of 1.5 to 3 and y is in the range of 0.1 to 0.5.

3. A catalyst according to claim 1, wherein the precursor includes anions other than carbonate, selected from the group consisting of nitrate and phosphate.

4. A catalyst according to claim 1, wherein the lanthanum component is derived from a salt selected from the group consisting of pure lanthanum salts and mixtures of rare earth salts.

5. A catalyst according to claim 1, wherein the atomic ratio Ni:Al is 1.5 to 4:1.

6. A catalyst according to claim 1, wherein the catalyst precursor is present within the pores of a preformed ceramic matrix.

7. A catalyst according to claim 6, wherein the active material is formed in a preformed ceramic matrix having an apparent porosity in the range of 15% to 80% and a mean pore diameter in the range of 0.1 $\mu$m to 20 $\mu$m.

8. A catalyst as in claim 6, wherein the ceramic matrix has been pre-treated with acid to modify the interaction between the catalytically active material and the ceramic matrix.

9. A catalyst as in claim 6, wherein the surface of the ceramic matrix has been modified by the addition of alumina spacer material within the pores of the ceramic matrix prior to the addition of the active phase.

10. A catalyst as in claim 6, wherein the ceramic matrix has been pre-treated with alkali to modify the interaction between the catalytically active material and the ceramic matrix.

11. A catalyst according to claim 1, wherein the precursor is calcined at 450° C.

12. A method of forming a catalyst from a solution of Ni, Al and La nitrates, comprising the steps of:
adding alkali to coprecipitate a nickel aluminum and lanthanum precursor from the solution;
maintaining the pH and temperature of the solution substantially constant during the precipitation;
recovering the precipitated precursor having a layer structure and an approximate chemical composition $$Ni_6Al_xLa_y(CO_3)_{(x+y)/2}(OH)_{12+2(x+y)}nH_2O$$

in which x is not less than 1 and not greater than 4; y is not less than 0.05 and not greater than 1.5, and n is approximately 4; and 13. A method according to claim 1, wherein the pH of the solution is maintained at approximately 7.

14. A method according to any of claim 12 or 13, wherein the solution is maintained at room temperature.

15. The method according to claim 12 including the additional steps of:
filtering the precursor from the solution in which it is precipitated;
washing the filtered precursor;
drying the washed precursor; and
partially calcining the dried precursor at approximately 300° C.

16. The method according to claim 15, including the additional step of fully calcining the partially calcined precursor at approximately 450° C. to form the catalyst.

17. A method of making a catalyst located in a porous body, comprising forming a solution of salts of nickel, aluminum and lanthanum, adding a hydrolysable material to the solution, locating the combined solution within the pores of a preformed ceramic matrix, heating the combined solution to a temperature suitable for controlled hydrolysis of the hydrolysable material thereby increasing the pH to precipitate the nickel, aluminum and lanthanum salts within the pores whereby the catalytically active metal component is almost exclusively confined to the pores, decomposing the metal salts to metal oxide or hydroxide form by calcining and reducing to form the catalyst.

18. A method according to claim 17, wherein the ceramic matrix has an apparent porosity in the range of 15% to 80% and a mean pore diameter in the range of 0.1 $\mu$m to 20 $\mu$m.

19. The method according to claim 17, including the additional step of pretreating the ceramic matrix with acid to modify the interaction between the catalytically active material and the ceramic matrix.

20. The method according to claim 17, including the additional step of pretreating the ceramic matrix by the addition of alumina spacer material within the pores of the ceramic matrix to modify the interaction between the catalytically active material and the ceramic matrix.

21. The method according to claim 17, including the additional step of pretreating the ceramic matrix with alkali to modify the interaction between the catalytically active material and the ceramic matrix.

22. A catalyst according to claim 1, wherein said coprecipitation is performed at a pH maintained at approximately 7.

23. A catalyst derived from a precursor having a layer structure and of the approximate chemical composition $Ni_6Al_xLa_y(CO_3)_{(x+y)/2}(OH)_{12+2(x+y)}nH_2O$ in which x is not less than 1 and not greater than 4; y is not less than 0.05 and not greater than 1.5 and n is approximately 4; said catalyst further including zirconium and wherein said precursor is calcined and then reduced to form said catalyst.

* * * * *